United States Patent [19]

Hansson

[11] 4,063,625
[45] Dec. 20, 1977

[54] IMPROVED SCREW OR NUT RUNNER

[75] Inventor: Gunnar Christer Hansson, Stockholm, Sweden

[73] Assignee: Atlas Copco Aktiebolag, Nacka, Sweden

[21] Appl. No.: 657,313

[22] Filed: Feb. 11, 1976

[30] Foreign Application Priority Data

Feb. 11, 1975 Sweden .................................. 7501491

[51] Int. Cl.² ........................ F16D 43/20; F16D 67/02
[52] U.S. Cl. ................................ 192/17 R; 81/52.4 A; 173/12; 188/185; 192/56 R; 192/150
[58] Field of Search .................... 192/17 R, 56 R, 150; 173/12; 81/52.4 R; 188/184, 185

[56] References Cited

U.S. PATENT DOCUMENTS

| | | | |
|---|---|---|---|
| 1,665,714 | 4/1928 | Noble | 188/184 |
| 2,020,739 | 11/1935 | Porter | 188/185 |
| 3,043,273 | 7/1962 | Schott | 121/34 |
| 3,316,782 | 5/1967 | Tullis | 81/52.5 |
| 3,666,021 | 5/1972 | Whitehouse | 192/150 X |
| 3,974,884 | 8/1976 | Gidlund | 173/12 |

Primary Examiner—Allan D. Herrmann
Attorney, Agent, or Firm—Flynn & Frishauf

[57] ABSTRACT

A screw or nut runner for tightening screw joints wherein a speed related braking force is applied upon those rotating parts of the nut runner that are positively coupled to the screw joint, thereby avoiding the influence of the inertia factor upon the obtained torque level. The power transmission of the screw or nut runner comprises a magnetic release clutch. A centrifugal brake is located after the release clutch in the power train for preloading the release clutch by generating a speed related braking force.

10 Claims, 5 Drawing Figures

IMPROVED SCREW OR NUT RUNNER

BACKGROUND OF THE INVENTION

This invention relates to apparatus for diminishing tightening torque variations in a screw or nut runner during use in tightening screw joints.

It is a well recognized phenomenon that when using a nut runner for tightening screw joints the final tightening torque obtained is not the same at hard and soft joints despite a specific maximum torque level being set on the tool. At soft joints the obtained final torque is substantially equal to the torque level predetermined by the tool setting, but at hard joints there is always obtained too high a torque.

The reason why an increased torque is obtained at hard joints is that when a hard screw joint is finally tightened the torque resistance arising therein increases very fast or instantaneously.

Though a nut runner is constructed so as to interrupt its power delivery as soon as the torque has reached its pre-set torque level, there is still generated a higher torque. The reason is that the desired torque level is reached very abruptly so that the rotating parts of the nut runner still have an inertia factor related to kinetic energy. This remaining kinetic energy is transferred to the joint in the form of an additional dynamic torque component.

Such a torque addition does not occur at soft joints because the kinetic energy of the rotating nut runner parts is successively absorbed by the joint in advance of reaching the desired torque level so at the end of the tightening operation there is no kinetic energy left to be transferred to the joint.

OBJECT OF INVENTION

It is the object of the invention to define a screw or nut runner which is prevented from delivering an increased tightening torque when applied on so called hard screw joints or by which the inertia factor influence upon the tightening torque (i.e., dynamic torque addition) exerted on a screw joint by a screw or nut runner is avoided.

BRIEF DESCRIPTION OF THE DRAWINGS

A nut runner according to the invention is hereinbelow described in detail with reference to the accompanying drawings in which FIG. 1 A shows a longitudinal section through the rear part of a nut runner and FIG. 1 B a section through the forward part.

DETAILED DESCRIPTION

Figures 1A, 1B:
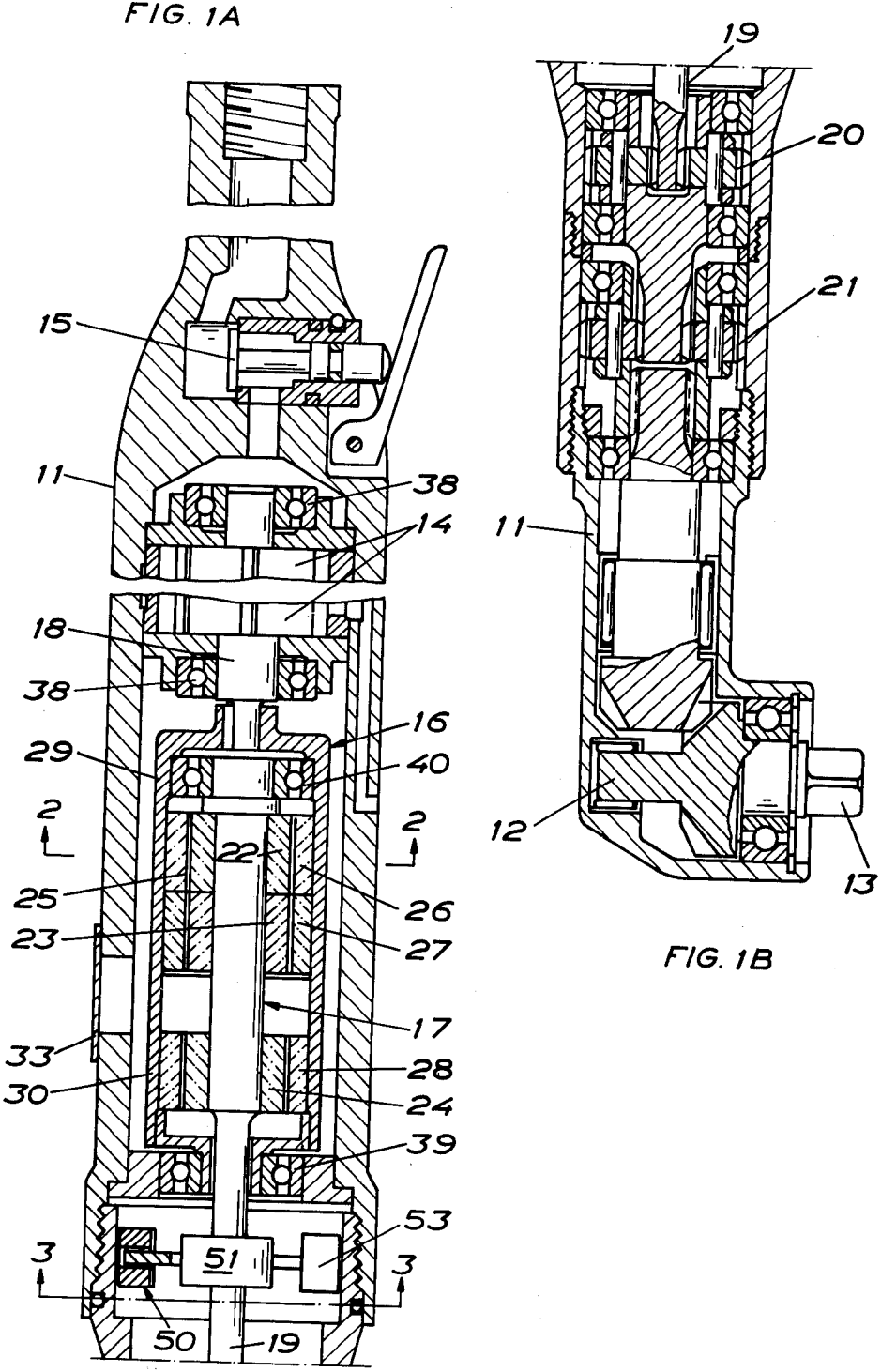

The nut runner shown in the drawings comprises a housing 11. In the front end of the housing 11 there is journalled an output shaft 12. The latter is formed with a drive square 13 upon which a nut sleeve can be attached in a conventional manner. Within the housing 11 there is mounted a pneumatic vane motor 14 which is supplied with pressure air through a control valve 15.

Figure 2:
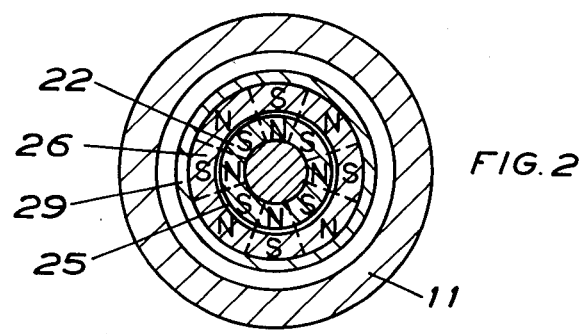
FIGS. 2 and 3 show cross sections through the nut runner in FIG. 1 A along lines 2—2 and 3—3 respectively.

To the drive shaft 18 of the motor 14 there is connected a torque release clutch 16, 17 of the magnetic field type. The driving part 16 of this clutch is tubular and is provided with internal rings 26, 27, 28 of permanent magnetic material. These rings are arranged to transmit a torque to the driven part 17 of the clutch over a tubular air gap 25. The driven part 17 of the clutch comprises external permanent magnetic rings 22, 23, 24 and is surrounded by the driving part 16. The magnetic rings are preferably magnetized according the pattern illustrated in FIG. 2 in order to establish an effective coupling between the clutch halves 16, 17.

The operation and the adjustability of the clutch which is not a part of this invention, is not described or illustrated in detail. It could be mentioned, however, that a desired torque release level can be set by changing the relative positions of the magnetic rings.

Moreover, the nut runner comprises a drive shaft 19 which is interconnected between the driven part 17 of the clutch and a reduction gear. The latter comprises of a two step planetary gear 20, 21.

Figure 3:
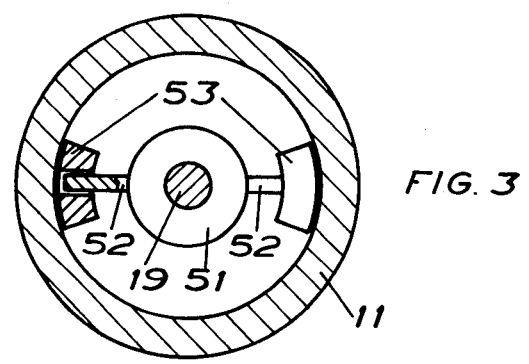

Further, as being shown in FIG. 1 A and FIG. 3, the nut runner is provided with a centrifugal brake 50 comprising a hub 51 secured to the drive shaft 19. The brake 50 also comprises two carrier pins 52 radially extending from the hub 51 and two brake shoes 53 which are provided with radial borings for cooperation with the carrier pins 52. The brake shoes 53 are freely slidable relative to the carrier pins 52.

The brake 50 also comprises a friction surface against which the brake shoes 53 are urged during rotation of shaft 19. This friction surface is formed on the inner wall of the housing 11. See FIGS. 1 A and 1 B. The wall of the housing is straight cylindrical and the brake shoes 53 are formed with a curved contact surface of the same radius. See FIG. 3.

Figure 4:
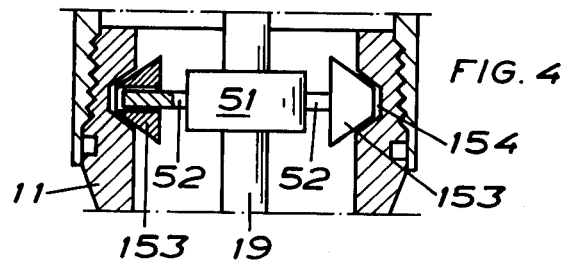
FIG. 4 is a fractional view in the same projection as FIG. 1 A and showing an alternative design of the nut runner in FIGS. 1 A and 1 B.

In FIG. 4 there is shown a brake according to an alternative design in which the friction surface has the form of a circumferential V-groove 154 in the housing wall. The brake shoes 153 are tapered so as to match the V-groove 154. The brake according to this embodiment gives an increased retarding force when the other parameters are kept unchanged.

As previously described, the torque resistance increases very rapidly at a hard joints and the rotating parts which are positively connected to the screw joint cause a torque addition as a result of the kinetic energy stored. By employing a braking device according to the invention it is possible to apply an additional retarding force upon the rotating parts of the nut runner so that the inertia forces of the power train members are eliminated at the end of the tightening sequence. As the braking force is related to the rotation speed of the nut runner the retarding action is most efficient when the nut runner is unloaded. This means that when the nut runner is brought to an almost instantaneous stop the braking force is still considerable at the moment the power delivery from the drive motor is interrupted.

Because of the fact that the speed is considerably lower when the final torque is reached at a soft joint the retarding effect of the brake is very small and the brake has no influence upon the torque level obtained.

The brake shown in the drawings is of the centrifugal type and has a desirable retarding characteristic. The contact forces acting upon the brake shoes varies in square relation to the rotation speed. That means that the retarding force is significantly decreased as the final torque level is reached at soft joints. The centrifugal type brake is very advantageous in that is is very efficient at high speed as at the end of a hard joint tightening but has just a diminutive effect upon the low speed operation at soft joint tightening.

At an operation, a nut socket is attached to the drive square 13 of the output shaft 12 and the nut runner is brought to engagement with a nut of a screw joint. (Not shown). Pressure air is supplied to the motor 14 by opening of valve 15. The motor 14 starts rotating and delivers a torque to the screw joint via the magnetic release clutch 16, 17, the drive shaft 19, the reduction gear 20, 21 and the output shaft 12. Positively and rotatively connected to the screw joint are the output shaft 12, the reduction gear 20, 21, the shaft 19, the brake 50 and the driven half 17 of the clutch which all participate in the power transmission.

As the torque resistance in the screw joint is very small at the beginning, the speed is high which means that the brake shoes 53 are urged outwardly by a strong centrifugal action, thereby establishing a retarding force relative to the housing 11.

As a result of the retarding force accomplished by the brake 50, the driving and driven halves 16, 17 of the release clutch are turned relative to each other over a certain angle. This means that the release clutch is preloaded and will require less of a load from the screw joint to be released. Thus, the brake 50 will influence the release clutch 16, 17 in such a way that the latter will interrupt the power supply at a torque level that is lower than the pre-set release level.

This means that by the release clutch preload generated by the brake there is obtained a compensation for dynamic torque addition arising at tightening hard joints.

However, if the rotation speed is very low at the end of the tightening operation the centrifugal forces acting upon the brake shoes are very small and the retarding action as well as the preload on the release clutch is diminutive. This means that when tightening a soft joint the release clutch 16, 17 will be loaded by the joint resistance only and will release properly at the pre-set torque level.

The invention is not limited to the described and illustrated embodiment.

What I claim is:

1. A screw or nut runner comprising:
   a housing,
   a motor,
   an output shaft, and
   a power transmission connecting said motor to said output shaft,
   said power transmission comprising a torque release clutch, and brake means located after said torque release clutch in the power train, and including means responsive to centrifugal forces for braking said power transmission and said output shaft relative to said housing by a decreasing magnitude during decreasing rotation speed of said output shaft.

2. A screw or nut runner according to claim 1, wherein said power transmission includes a shaft, and said brake means comprises a friction surface means on said housing, two or more radially movable brake shoes and a carrier hub drivingly coupling said brake shoes to said shaft of said power transmission.

3. A screw or nut runner according to claim 1, wherein said brake means include means for braking said power transmission and said output shaft in square relation to the rotation speed of said output shaft.

4. A screw or nut runner according to claim 1, in which said power transmission comprises a reduction gear, and said brake means is located before said reduction gear.

5. A screw or nut runner according to claim 4, wherein said power transmission includes a shaft, and said brake means comprises a friction surface means on said housing, two or more radially movable brake shoes and a carrier hub drivingly coupling said brake shoes to said shaft of said power transmission.

6. A screw or nut runner according to claim 1, wherein said carrier hub comprises a number of radially extending pins along which said brake shoes are freely slidable.

7. A screw or nut runner according to claim 6, wherein said friction surface means comprises a part of the inner wall of said housing.

8. A screw or nut runner according to claim 7, wherein said friction surface means comprises an annular V-groove, and said brake shoes are tapered so as to match said V-groove.

9. A screw or nut runner according to claim 5, wherein said friction surface means comprises a part of the inner wall of said housing.

10. A screw or nut runner according to claim 9, wherein said friction surface means comprises an annular V-groove, and said brake shoes are tapered so as to match said V-groove.

* * * * *